United States Patent
Oesterling et al.

(10) Patent No.: US 6,853,910 B1
(45) Date of Patent: Feb. 8, 2005

(54) VEHICLE TRACKING TELEMATICS SYSTEM

(75) Inventors: Christopher L. Oesterling, Troy, MI (US); Gary A. Watkins, Royal Oak, MI (US)

(73) Assignee: General Motors Corporation, Detroit, MI (US)

(*) Notice: Subject to any disclaimer, the term of this patent is extended or adjusted under 35 U.S.C. 154(b) by 2 days.

(21) Appl. No.: 10/638,905

(22) Filed: Aug. 11, 2003

(51) Int. Cl.[7] ......................... G06F 19/00; G01C 21/26
(52) U.S. Cl. .................... 701/207; 701/213; 455/456.2; 342/357.07
(58) Field of Search ................... 701/207, 213–216; 342/357.06, 357.07; 455/455.1, 455.2, 455.3, 455.5, 455.6

(56) References Cited

U.S. PATENT DOCUMENTS

| | | | | |
|---|---|---|---|---|
| 5,742,914 A | * | 4/1998 | Hagenbuch | 701/35 |
| 5,895,436 A | * | 4/1999 | Savoie et al. | 701/214 |
| 6,661,372 B1 | * | 12/2003 | Girerd et al. | 342/357.12 |
| 6,662,013 B2 | * | 12/2003 | Takiguchi et al. | 455/456.2 |
| 6,757,543 B2 | * | 6/2004 | Moran et al. | 455/456.1 |
| 2003/0149526 A1 | * | 8/2003 | Zhou et al. | 701/213 |

* cited by examiner

Primary Examiner—Gary Chin
(74) Attorney, Agent, or Firm—Anthony Luke Simon (57) ABSTRACT

A method of tracking vehicles comprising monitoring for registration request signal data and receiving the registration request signal data at a call center. The method further comprises determining a vehicle transmission location based on the registration request signal data and obtaining a registration request signal transmission time from the registration request signal data. Additionally, the method further comprises determining a vehicle indentification number based on the registration request signal data and updating a vehicle tracking database with the vehicle transmission location and the registration request signal transmission time.

20 Claims, 5 Drawing Sheets

VEHICLE TRACKING TELEMATICS SYSTEM

FIELD OF THE INVENTION

This invention relates generally to tracking vehicles for asset management. In particular, the invention relates to tracking vehicles having installed telematics systems while transporting vehicles from factories to vehicle dealerships.

BACKGROUND OF THE INVENTION

The opportunity to personalize features in a mobile vehicle is ever increasing as the automobile is being transformed into a communications and entertainment platform as well as a transportation platform. Many new American cars are installed with some type of telematics unit to provide wireless communication and location-based services. These services are accessible through interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

It is desirable to use telematics services described above to identify and track vehicles, such as cars, trucks and vans, as they are moved between holding lots and/or dealership lots. In particular, automatic tracking of a vehicle when a vehicle is one of several being transported from a factory to a dealership would improve asset monitoring for a dealership or factory.

SUMMARY OF THE INVENTION

One aspect of the present invention provides a method of tracking vehicles where the method comprises monitoring for registration request signal data and receiving the registration request signal data at a call center. The method further comprises determining a vehicle transmission location based on the registration request signal data and obtaining a registration request signal transmission time from the registration request signal data. The method then determines a vehicle indentification number based on the registration request signal data and updates a vehicle tracking database with the vehicle transmission location and the registration request signal transmission time.

Another aspect of the present invention provides a vehicle tracking system comprising means for monitoring for registration request signal data and means for receiving the registration request signal data at a call center. The vehicle tracking system additionally comprises means for determining a vehicle transmission location based on the registration request signal data, means for obtaining a registration request signal transmission time from the registration request signal data, means for determining a vehicle indentification number based on the registration request signal data and means for updating a vehicle tracking database with the vehicle transmission location and the registration request signal transmission time.

A third aspect of the present invention provides a computer readable medium storing a computer program comprising computer readable code for monitoring registration request signal data, receiving the registration request signal data at a call center, determining a vehicle transmission location based on the registration request signal data, obtaining a registration request signal transmission time from the registration request signal data, determining a vehicle indentification number based on the registration request signal data and updating a vehicle tracking database with the vehicle transmission location and the registration request signal transmission time.

The forgoing device and other devices as well as features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

The present invention is illustrated by way of example and not limitation in the accompanying figures, in which like references indicate similar elements, and in which.

DETAILED DESCRIPTION OF THE PRESENTLY PREFERRED EMBODIMENTS

Figure 1:
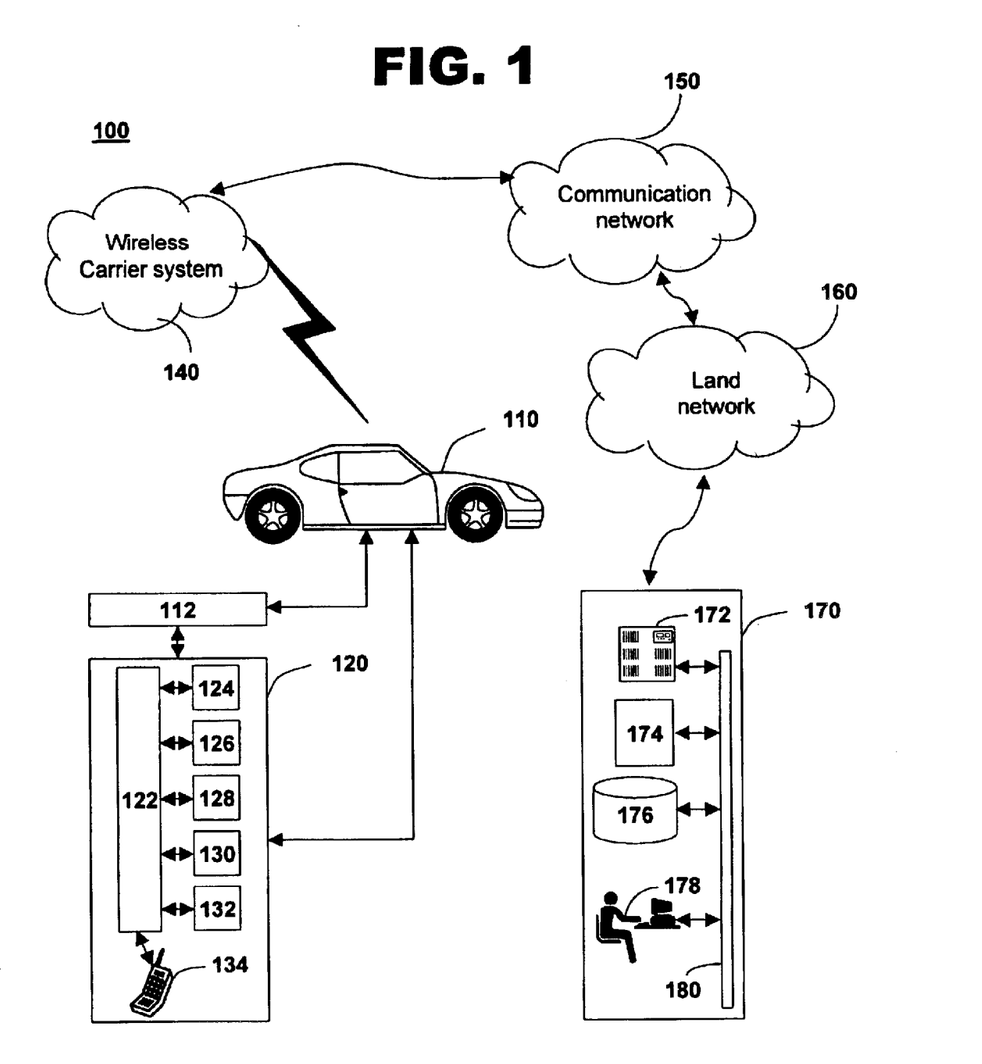
FIG. 1 is a schematic diagram of a system for providing access to a telematics unit in a mobile vehicle.

FIG. 1 is a schematic diagram of a system for providing access to a telematics unit in a mobile vehicle. Telematics-unit access system 100 includes a mobile vehicle 110, a telematics unit 120, one or more wireless carrier systems 140, one or more communication networks 150 and one or more land networks 160, and one or more call centers 170. A telematics unit 120 provides the telecommunications link in one embodiment of this present invention. Mobile vehicle 110 includes vehicles such as cars, vans or trucks equipped with suitable hardware and software for transmitting and receiving voice and data communications.

In some embodiments of this invention, telematics unit 120 includes a digital signal processor (DSP) 122 connected to a wireless modem 124, a global positioning system (GPS) receiver or GPS unit 126, a memory 128, a microphone 130, one or more speakers 132, and an embedded or in-vehicle phone 134. DSP 122 is also referred to as a microcontroller, controller, host processor, or vehicle communications processor. Functions provided by GPS unit 126 include longitude and latitude coordinates of the vehicle. Furthermore, GPS unit 126 provides date and time information, within the accuracy of the GPS system. The in-vehicle phone 134 is selected from the group including, but not limited to, an analog, digital, dual-mode, dual-band, multi-mode or multi-band cellular phone. In this document, the phrase in-vehicle phone 134 and wireless phone 134 will be used interchangeably.

Telematics unit 120 has capability to store phone numbers and messages in memory 128. Telematics unit 120 has capability to set or reset calling-state indicators and to enable or disable various cellular-phone and telematics-unit functions when directed by an executable computer program running on DSP 122. Telematics unit 120 has capability to send and receive over-the-air messages using, for example, a pseudo-standard air-interface function or other proprietary and non-proprietary communication links.

DSP 122 executes various computer programs and computer program code that control programming and operational modes of electronic and mechanical systems within telematics unit 120. DSP 122 has capability to control communications between telematics unit 120, wireless carrier system 140, and call center 170. The wireless carrier system 140 includes a wireless service provider database (not illustrated in FIG. 1). In some embodiments of this invention, voice-recognition application is installed in DSP 122 to translate human voice input through microphone 130 to digital signals. The capability to, for example, program in-vehicle phone 134 will be controlled with verbal commands that are translated by voice-recognition software executed by DSP 122. Alternatively, in other embodiments of this invention, pushing buttons on an interface of telematics unit 120 or in-vehicle phone 134 will be used to indicate a call termination or a call acceptance. The interface to telematics unit 120 includes one or more buttons on the telematics unit, radio console, or associated keyboard or keypad. In other embodiments, the interface to telematics unit 120 includes other forms of preference and data entry including touch-screens, wired or wireless keypad remotes, or other wirelessly connected devices such as Bluetooth-enabled devices, or devices compliant with 802.11 standards.

DSP 122 controls, generates and accepts digital signals transmitted between telematics unit 120 and a vehicle communication bus 112 that is connected to various electronic modules and sensors in mobile vehicle 110. Some functional capabilities of DSP 122 include activation of various programming and operation modes, as well as provision for data transfers. Additional functional capabilities of DSP 122 include translation of signals into voice messages to be sent out through speaker 132. One of the generated voice messages might, for example, include a phone number prompt given when a user has requested and entered a programming mode of in-vehicle phone 134.

Mobile vehicle 110 via telematics unit 120 has the capability to send and receive radio transmissions from wireless carrier system 140. Wireless carrier system 140 includes any suitable system for transmitting a signal from mobile vehicle 110 to communication network 150.

Communication network 150 includes services provided by one or more mobile telephone switching offices and wireless networks. Communication network 150 includes connect wireless carrier system 140 to land network 160. Communication network 150 includes any suitable system or collection of systems for connecting wireless carrier system 140 to mobile vehicle 110 and land network 160. Communication network 150 has capability to send and receive short messages according to established protocols such as IS-637 standards for short message service (SMS), IS-136 air-interface standards for SMS, and GSM 03.40 and 09.02 standards. Similar to paging, an SMS communication might, for example, be posted along with an intended recipient, such as a communication device in mobile vehicle 110.

Land network 160 is a public-switched telephone network. Land network 160 includes Internet protocol (IP) networks. Land network 160 also includes wired networks, optical networks, fiber networks, other wireless networks, or any combination thereof. Land network 160 is connected to one or more landline telephones. In some embodiments of the invention, land network 160 and communication networks 150 are connected to call center 170. In some embodiments, communication network 150 and land network 160 connect wireless carrier system 140 to a communication node or call center 170.

In one embodiment of the invention, call center 170 includes one or more voice and data switches 172, one or more communication services managers 174, one or more communication services databases 176, one or more communication services advisors 178, and one or more networks 180.

Call center 170 is a location with capability to receive many calls to be serviced at the same time and to send many calls at the same time. In some embodiments of this invention, the call center is a telematics call center, prescribing communications to and from telematics unit 120 in mobile vehicle 110. In alternate embodiments, the call center is a voice call center, providing verbal communications between an advisor in the call center and a subscriber in a mobile vehicle. In some embodiments of the present invention, the call center contains each of these functions. In some embodiments of the present invention, call center 170 is capable of receiving a telematics unit access requests from a telematics user via wireless carrier system 140, communication network 150, over land network 160, or any combination thereof.

In some embodiments of the present invention, call center 170 contains one or more voice and data switches 172, where the switches 172 are connected to land network 160 and the switches 172 transmit voice or data transmissions from call center 170. In alternate embodiments, switch 172 receives voice or data transmissions from telematics unit 120 in mobile vehicle 110 through wireless carrier system 140, communication network 150, and land network 160. In other embodiments, switch 172 receives from or sends to one or more communication services managers 174 data transmissions via one or more networks 180. In some embodiments, communication services manager 174 comprises suitable hardware and software capable of providing requested communication services to telematics unit 120 in mobile vehicle 110. In some embodiments, communication services manager 174 sends to or receives from one or more communication services databases 176 data transmissions via network 180. In some embodiments, communication services manager 174 sends to or receives from one or more communication services advisors 178 data transmissions via network 180. In some embodiments, communication services database 176 sends to or receives from communication services advisor 178 data transmissions via network 180. In some embodiments, communication services advisor 178 receives from or sends to switch 172 voice or data transmissions.

Communication services manager 174 provides one or more of a variety of services, including enrollment services, navigation assistance, vehicle personalization, vehicle data upload, vehicle data download, replenish subscriber minutes, unlock/lock vehicle, flash lights, honk horn, perform diagnostic functions and perform vehicle tracking functions. Communication services manager 174 has the capability to transmit data to telematics unit 120 in mobile vehicle 110 through wireless carrier system 140, communication network 150, land network 160, voice and data switch 172, and network 180. In some embodiments, communication services manager 174 stores or retrieves data and information from communication services database 176. In some embodiments, communication services manager 174 provides requested information to communication services advisor 178. In some embodiments, communication services manager 174, along with the other components of call center 170, sends over-the-air messages to enable or disable telematics unit 120 through land network 160, communication network 150, and wireless carrier system 140.

In some embodiments, communication services advisor 178 is a real advisor or a virtual advisor. A real advisor is a human being in verbal communication with a user or subscriber in mobile vehicle 110 via telematics unit 120. In some embodiments, the virtual advisor is a synthesized voice interface responding to requests from telematics unit 120 in mobile vehicle 110. This virtual advisor includes one or more recorded messages.

Communication services advisor 178 provides services to telematics unit 120 in mobile vehicle 110. Possible services provided by communication services advisor 178 are enrollment services, navigation assistance, real-time traffic advisories, directory assistance, roadside assistance, business or residential assistance, information services assistance, emergency assistance, and communications assistance. In some embodiments, communication services advisor 178 communicates with telematics unit 120 in mobile vehicle 110 through wireless carrier system 140, communication network 150, and land network 160 using voice transmissions, or through communication services manager 174 and switch 172 using data transmissions.

Typically, mobile vehicle 110 initiates a service request to call center 170 by sending a voice or digital-signal command to telematics unit 120 which in turn, sends an instructional signal or a voice call through wireless modem 124, in-vehicle phone 134, wireless carrier system 140, communication network 150, and land network 160 to call center 170. In some embodiments, call center 170 determines mobile identification numbers and telematics unit identifiers associated with a telematics unit access request, compare mobile identification numbers and telematics unit identifiers with a database of identifier records, and send calling-state messages to the telematics unit based on the request and identification numbers.

In some embodiments, software including a program to provide access to the telematics unit resides, at least in part, at the call center. Such a program includes computer program code to receive a telematics unit access request, to determine a mobile identification number, and to determine a telematics unit identifier. The program compares the mobile identification number and the telematics unit identifier with a database of identifier records, and sends a calling-state message based on the telematics unit access request. In some embodiments, the software is provided on any suitable computer usable medium such as a compact disc, digital video disc, magnetic media, semiconductor memory, nonvolatile or permanent memory. Computer program code, which resides on any suitable computer usable medium such as magnetic, optical, or semiconductor media, has capability to store the updated mobile identification number and calling-state indicator in the telematics unit, and enable the cellular phone. Computer program code to set the calling-state indicator to a predefined billing state and to disable the embedded cellular phone, in some embodiments, resides, in part, within the telematics unit and is executed by a processing unit within the telematics unit.

Figure 2:
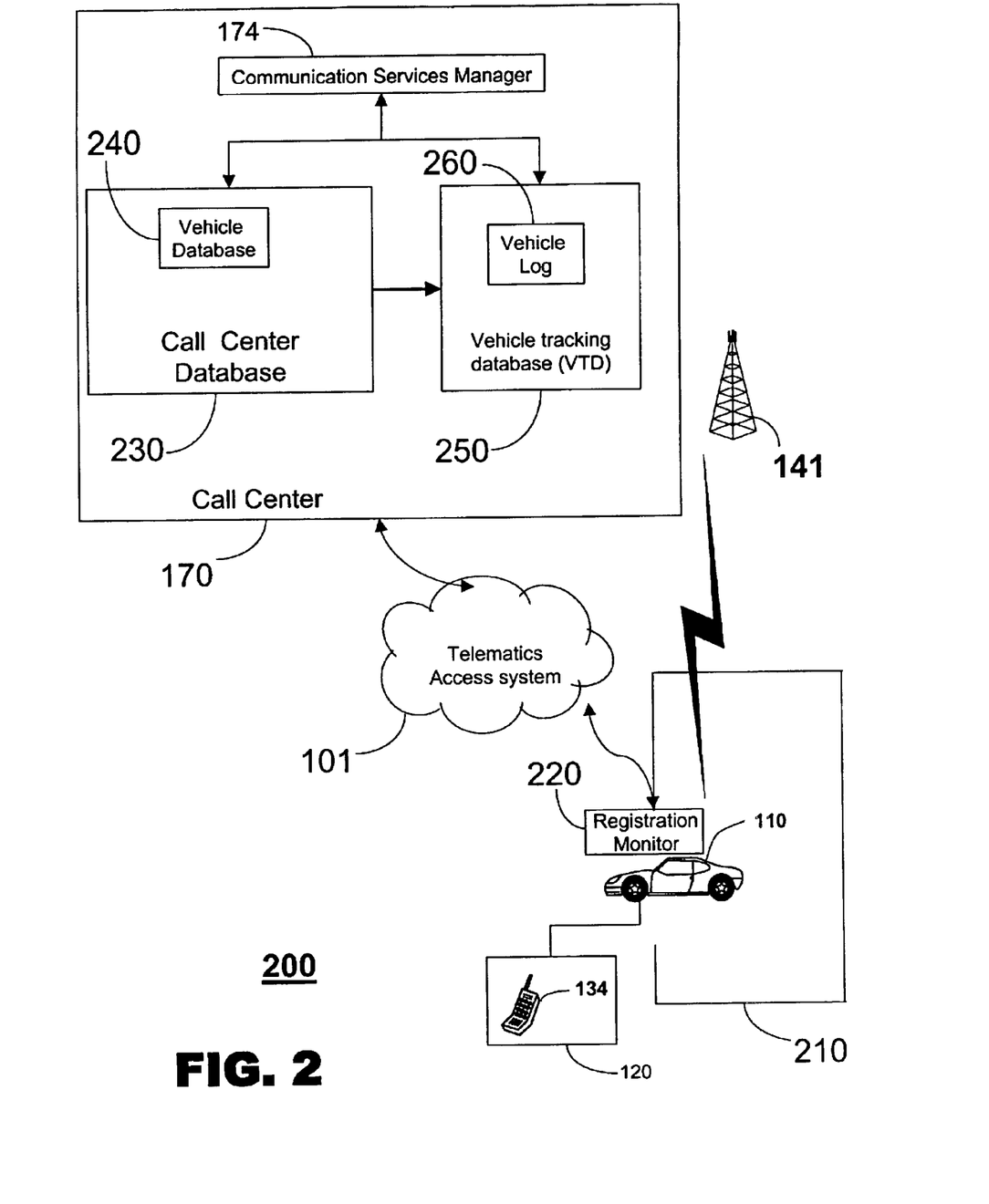
FIG. 2 is a schematic diagram of a first embodiment of a vehicle tracking telematics system in accordance with the present invention.

FIG. 2 is a schematic diagram of a first embodiment of a vehicle tracking telematics system 200 in accordance with the present invention. A vehicle 110 in a holding lot 210 is powered up or the telematics unit 120 is powered up with a wake-up cycle. A telematics unit 120 having a wireless phone 134 is installed in the vehicle 110. The telematics unit 120 is automatically powered up when the vehicle 110 is powered up, or with a wake-up cycle. When the telematics unit 120 is powered up, a registration request signal is emitted from the wireless phone 134 to cell towers 141 within receiving range of the emitted registration request signal. The registration request signal comprises data including the electronic serial number (ESN) of the wireless phone 134 and the time of the transmission of the registration request signal, as well as the Mobile Identification Number (MIN). The holding lot 210 is equipped with a vehicle holding lot registration monitor 220, which also receives the registration request signal emitted from the wireless phone 134 to the cell tower 141. Cell tower 141 is part of the wireless carrier system 140 (FIG. 1). The holding lot registration monitor 220 includes a receiver to receive the registration request signal emitted from the wireless phone 134 and a network connection, which is in communication with a telematics access system 101. The telematics access system 101 includes one or more wireless carrier systems 140 (FIG. 1), one or more communication networks (FIG. 1) and one or more land networks (FIG. 1).

The registration request signal data emitted from the wireless phone 134 is monitored by the holding lot registration monitor 220 and sent via the telematics access system 101 to a call center 170. The call center 170 comprises at least one call center database 230, at least one vehicle tracking database 250 and at least one communications services manager 174. In an alternate embodiment (not illustrated), the call center 170 comprises at least one communications services manager 174 and the call center 170 is in communication with at least one external call center database 230 and with at least one external vehicle tracking database 250.

The call center database 230 comprises a vehicle database 240, which comprises a table of electronic serial numbers for wireless phones 134 and correlated vehicle identification numbers. The vehicle tracking database 250 comprises at least one vehicle log 260. The vehicle log 260 for a vehicle 110 having a vehicle identification number comprises a table of vehicle transmission locations and registration request signal transmission times. The call center database 230, the vehicle tracking database 250 and the communication services manager 174 are in communication with each other.

Figure 3:
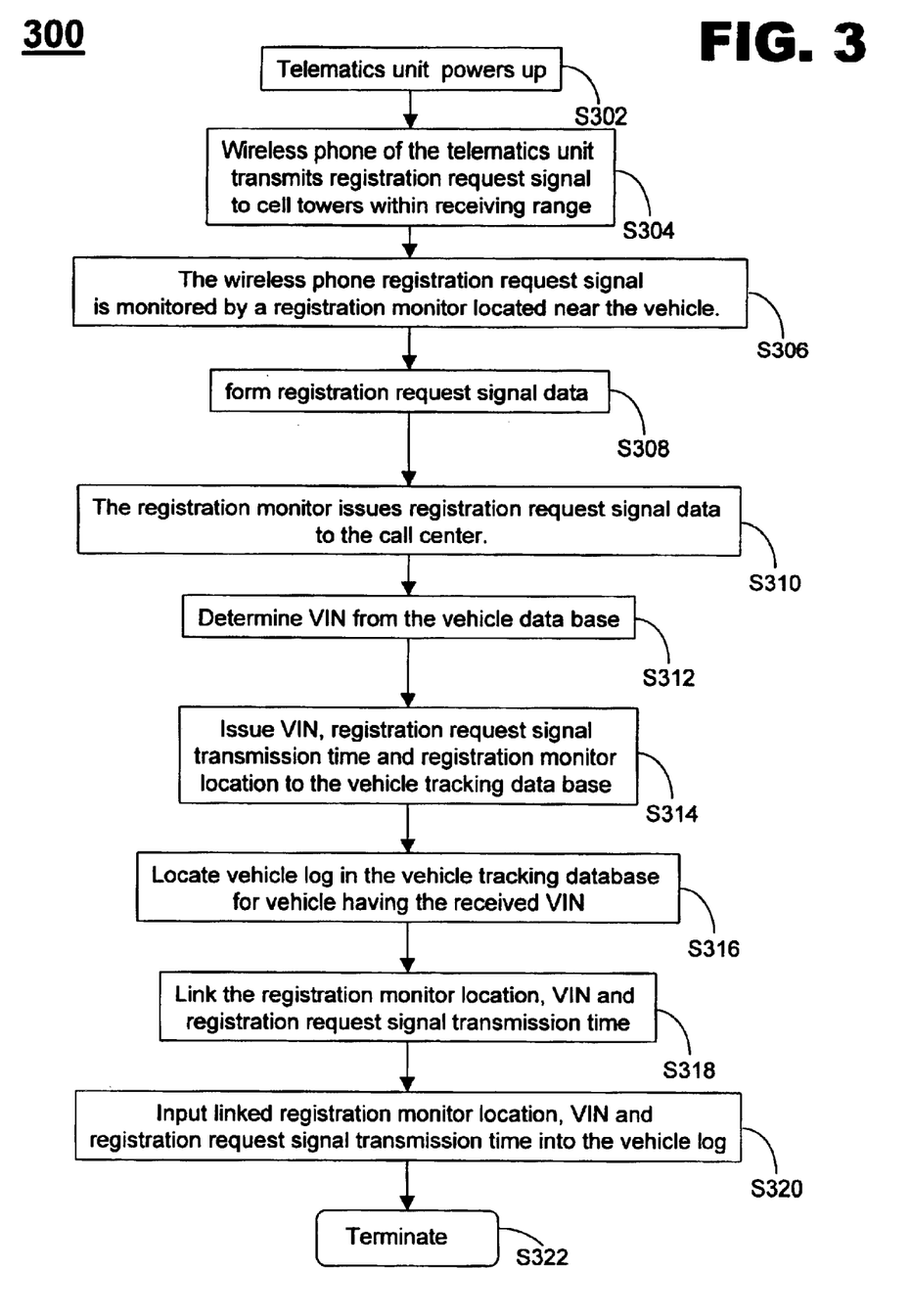
FIG. 3 illustrates a flowchart representative of the method of operation of the vehicle tracking telematics system as illustrated in FIG. 2.

FIG. 3 illustrates a flowchart 300 representative of the method of operation of an exemplary vehicle tracking telematics system 200, as illustrated in FIG. 2. During stage S302, a telematics unit (TU) 120 is turned on when a vehicle 110 within holding lot 210 is powered up, or during a wake-up cycle. During stage S304 the wireless phone 134 of the telematics unit 120 transmits a registration request signal to cell towers 141 within receiving range. During stage S306 the wireless phone 134 registration request signal is monitored by the registration monitor 220 located in or near the holding lot 210 in which the vehicle 110 is located. The registration request signal comprises, at least, an electronic serial number that identifies the wireless phone 134, which transmitted the registration request signal. The receiver 220 is located, in an exemplary embodiment, at the exit gate of the holding lot 210.

During stage S308, the registration monitor 220 combines the registration monitor location with the registration request signal, as well as registration request date and registration request time, to form registration request signal data. In one embodiment, it is sufficient to set the vehicle transmission location to be the same as the registration monitor 220 location since the vehicle 110 is within or leaving the holding lot 210 in which the registration monitor 220 is located. In some embodiments, the location of the registration monitor 220 will comprise longitude and latitude coordinates of the registration monitor 220 as used in global positioning systems (GPS) such as those described in FIG. 1 or an address or a region identifier. In other embodiments the vehicle transmission location will comprise an address of the holding lot 210. In other embodiments the vehicle transmission location will comprise an address of the holding lot 210, as well as longitude and latitude coordinates of the vehicle 110 and/or the registration monitor 220.

In one embodiment, the sensitivity of registration monitor 220 may be attenuated and used in conjunction with a plurality of registration monitors to limit the geographic area covered by each individual registration monitor. Such narrowing of the geographic area provides for more specific geographic information regarding the vehicle.

During stage S310 the receiver 220 transmits the registration request signal data to the call center 170. The communication services manager 174 in call center 170 will communicate the electronic serial number of wireless phone 134, which is included in the registration request signal data, to the call center database 230. The call center database 230 has a vehicle database 240, which includes a table comprised of electronic serial numbers and correlated vehicle identification numbers (VIN) for at least one vehicle 110.

Input to the vehicle database 240 comes from several sources. One data source is the vehicle factories (not shown), which install the telematics unit 120 in the vehicles 110 during manufacture of the vehicles 110. Upon installation of a telematics unit 120, the vehicle identification number and the electronic serial number of the wireless phone 134 of a telematics unit 120 is transmitted by the factory to the call center 170 as correlated data for the vehicle database 240. Another data source is the subscriber to the telematics-unit access system 100.

During stage S312 the vehicle identification number is determined by searching the vehicle database 240 for the electronic serial number in the registration request signal data and retrieving the correlated vehicle identification number.

During stage S314 the retrieved vehicle identification number, the registration request signal transmission time and the vehicle transmission location are issued to the vehicle tracking database 250. The data is issued either directly from the call center database 230 or through the communication services manager 174. Alternately, part of the data is issued from the call center database 230 to the vehicle tracking database 250 and part of the data is issued from the communication services manager 174 to the vehicle tracking database 250.

The vehicle tracking database 250 comprises a vehicle log 260. The vehicle log 260 for vehicle 100 having a vehicle identification number comprises a table including, at least, a time and a vehicle location. The times will be registration request signal transmission times except, in some embodiments, for the first time listed in the vehicle log 260, as will be described below. The time includes both date and hour of the day, as well as minutes and seconds. The vehicle location will be vehicle transmission location except, in some embodiments, for the first location listed in the vehicle log 260, as will be described below.

In an one embodiment, the vehicle log 260 for vehicle 110 is set up when the vehicle factory (not shown), which installed the telematics unit 120 in the vehicle 110 during manufacture of the vehicle 110, issues the vehicle identification number, the time of manufacture and the electronic serial number of the wireless phone 134 of the telematics unit 120 to the call center 170. In that case, the first time in the vehicle log 260 is the time of manufacture and the first vehicle location in the vehicle log 260 is the factory location.

In yet another embodiment, the vehicle log 260 for vehicle 110 is set up the first time a transmission is received at the call center 110 in response to a matching electronic serial number found during stage S510. In that case, the first time in the vehicle log 260 is the registration request signal transmission time and the first vehicle location in the vehicle log 260 is the vehicle transmission location.

During stage S316 the vehicle log 260 for the vehicle 110 is located in the vehicle tracking database 250 having the vehicle identification number correlated with the electronic signal number of the received registration request signal data.

During stage S318 registration request signal transmission time, the vehicle identification number and the vehicle transmission location, which are correlated to the electronic serial number, are linked. Alternately the registration request signal transmission time, the vehicle identification number and the vehicle transmission location data linking will occur at the call center data base 230 or at the communication services manager 174 during the period of time between stages S312 and S314 of flowchart 300. Alternately registration request signal transmission time, the vehicle identification number and the vehicle transmission location data linking will occur in part at the call center data base 230 and in part at the communication services manager 174 during the period of time between stages S312 and S314 of flowchart 300.

The linked registration request signal transmission time, vehicle identification number and vehicle transmission location are located within the vehicle tracking database 250 by the end of stage S318.

During stage S320 the linked data including the registration request signal transmission time and the vehicle transmission location is input into the vehicle log 260 for the vehicle 110 which emitted a registration request to a wireless tower 141 during stage S302. The data input into vehicle log 260 is used to track vehicles during transport, for example, while shipping vehicle 110 from a factory to a car dealership. In an alternate example, the data input into vehicle log 260 is used to track vehicle 110 during transport from one car dealership to another car dealership. In one embodiment, updating to the vehicle log 260 for vehicle 110 is terminated upon sale of the vehicle 110. During stage S322 the flowchart 300 is terminated.

Figure 4:
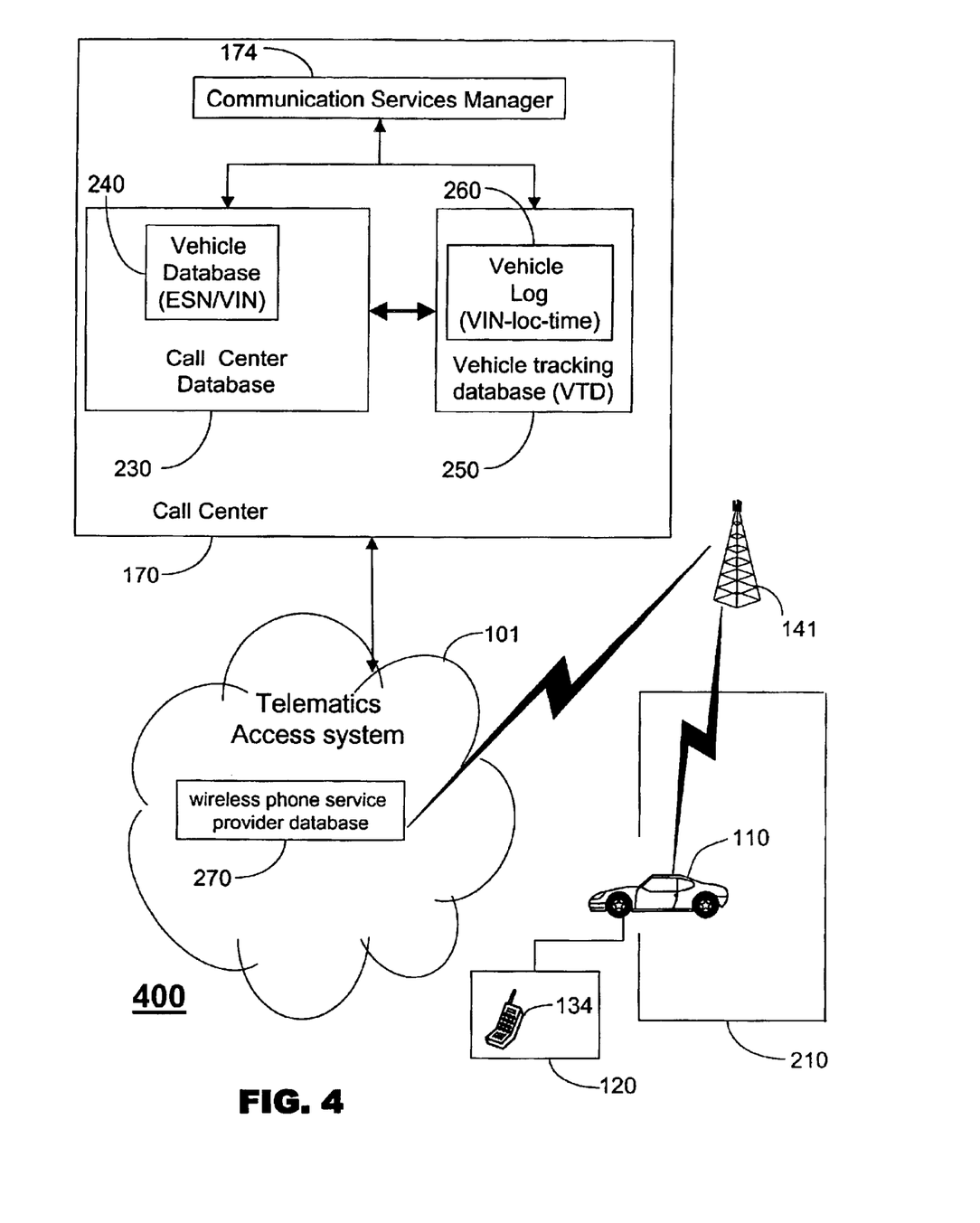
FIG. 4 is a schematic diagram of a second embodiment of a tracking system in accordance with the present invention.

FIG. 4 is a schematic diagram of a second embodiment of a vehicle tracking telematics system 400 in accordance with the present invention. A vehicle 110 in a holding lot 210 is powered up. A telematics unit 120 having a wireless phone 134 is installed in the vehicle 110. In embodiment, the telematics unit 120 is automatically powered up when the vehicle 110 is powered up. In another embodiment, the telematics unit 120 powers up according to a wake-up cycle. Wake-up cycles are known in the art. When the telematics unit 120 is powered up, a registration request signal is emitted from the wireless phone 134 to at least one cell tower 141 within receiving range of the emitted registration request signal. The registration request signal comprises data including the electronic serial number of the wireless phone 134 and the time of the transmission of the registration request signal. Cell tower 141 is part of the wireless carrier system 140 (FIG. 1). The at least one cell tower 141 is in communication with telematics access system 101, which includes a wireless service provider database 270. The telematics access system 101 also includes one or more wireless carrier systems 140 (FIG. 1), one or more communication networks 150 (FIG. 1) and one or more land networks 160 (FIG. 1).

The call center 170, which is part of the telematic unit access system 100 (FIG. 1) is in communication with the wireless service provider database. The call center 170 comprises at least one call center database 230, at least one vehicle tracking database 250 and at least one communications services manager 174. In an alternate embodiment (not illustrated), the call center 170 comprises at least one communications services manager 174 and the call center 170 is in communication with at least one external call center database 230 and with at least one external vehicle tracking database 250.

The call center database 230 comprises a vehicle database 240, which comprises a table of electronic serial numbers for wireless phones 134 and correlated vehicle identification numbers. The vehicle tracking database 250 comprises at least one vehicle log 260. The vehicle log 260 for a vehicle 110 having a vehicle identification number comprises a table of vehicle transmission locations and registration request signal transmission times. The call center database 230, the vehicle tracking database 250 and the communication services manager 174 are in communication with each other.

Figure 5:
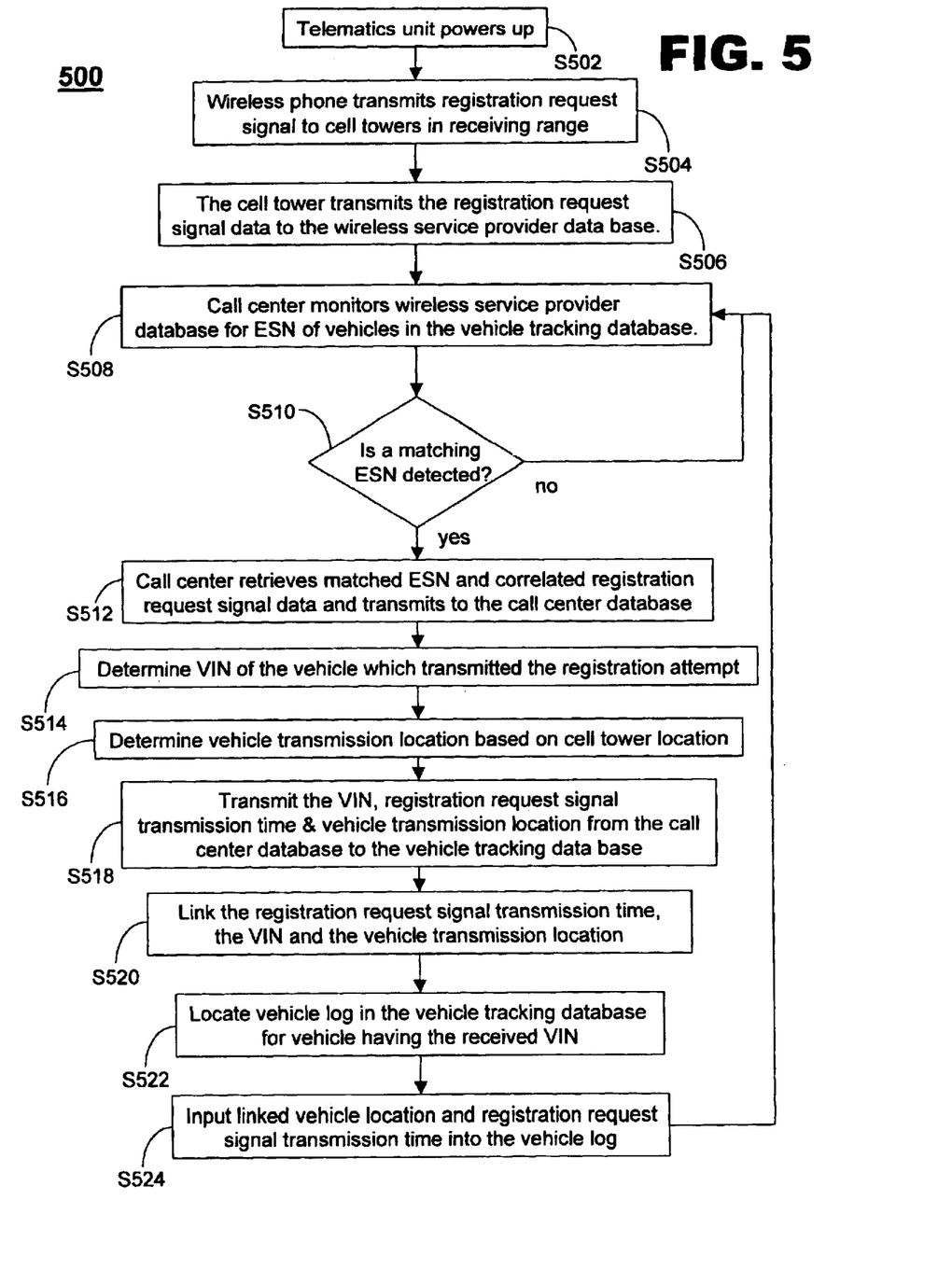
FIG. 5 is a flowchart representative of the second embodiment of the tracking system illustrated in FIG. 4.

FIG. 5 illustrates a flowchart 500 representative of the method of operation of an exemplary vehicle tracking telematics system 400, as illustrated in FIG. 4. During stage S502 a telematics unit (TU) 120 is turned on when a vehicle 110 within holding lot 210 is powered up or during a wake-up cycle. During stage S504 the wireless phone 134 of the telematics unit 120 transmits a registration request signal to cell towers 141 within receiving range.

During stage S506 the cell tower 141 transmits registration request signal data to the wireless service provider database 270. The registration request signal data comprises, at least, the time of the registration request signal transmission from the wireless phone 134, the location of the cell tower 141 that received the transmission and an electronic serial number (ESN) that identifies the wireless phone 134, which transmitted the registration request signal. The time includes both date and hour of the day.

During stage S508 the call center (CC) 170 monitors input to the wireless service provider database 270 for the electronic serial number (ESN) of the vehicles 110 listed in the vehicle database 240 within or in communication with the call centers 170, which are part of the vehicle tracking telematics system 400. This is a periodic monitoring with a predetermined time between monitoring episodes, as set within the call center 170.

During stage S510 it is determined if a matching electronic serial number (ESN) is found in the both wireless service provider database 270 and the vehicle database 240, which is within or in communication with the call center 170. If it is determined that a matching electronic signal number is not found, the flow proceeds to stage S508. If it is determined that a matching electronic signal number is found, the flow proceeds to stage S512 and the monitoring continues.

During stage S512 the call center 170 retrieves the matched electronic signal number and the correlated registration request signal data. During stage S514 the vehicle identification number (VIN) of the vehicle 110 which transmitted the registration attempt to cell tower 141 is determined. In one embodiment, the communication services manager 174 in call center 170 communicates the matching electronic serial number of wireless phone 134 to the call center database 230. The call center database 230 has a vehicle database 240, which includes a table comprised of electronic serial numbers and correlated vehicle identification numbers (VIN) for at least one vehicle 110. The vehicle identification number is determined by searching the vehicle database 240 within the call center database 230 for the electronic serial number matched during stage S510. Input to the vehicle database 240 comes from several sources as discussed in relation to FIG. 3.

During stage S516, the vehicle location at the time of transmission of the registration request signal is determined. The location of the vehicle 110 at the time of transmission of the registration request signal is determined to be within the geographical area of the cellular system within range of the cell tower 141. If tracking is implemented for a vehicle 100 being transported across the United States, for example, then this resolution is sufficient. In one embodiment of the present invention, the call center 170 has data correlating locations of holding lots 210 within the geographical area of the cellular system within range of the cell tower 141. In that embodiment, it is established that the vehicle 110 is located at one of those holding lots 210. In other embodiments of the present invention, additional data about signal strength and phase are used to identify from which holding lot 210 the vehicle 110 transmitted the registration request signal.

During stage S518 the retrieved vehicle identification number, the registration request signal transmission time and the vehicle transmission location are transmitted to the vehicle tracking database 250. The data is transmitted either directly from the call center database 230 or through the communication services manager 174. Alternately, part of the data is transmitted from the call center database 230 to the vehicle tracking database 250 and part of the data is transmitted from the communication services manager 174 to the vehicle tracking database 250.

The vehicle tracking database 250 comprises at least one vehicle log 260. The vehicle log 260 for vehicle 100 having a vehicle identification number comprises a table including, at least, a time and a vehicle location. The times will be registration request signal transmission times except, in some embodiments, for the first time listed in the vehicle log 260, as will be described below. The time includes both date and hour of the day and the minutes and seconds of the time. The vehicle location will be a vehicle transmission location except, in some embodiments, for the first location listed in the vehicle log 260, as will be described below.

In an one embodiment, the vehicle log 260 for vehicle 110 is set up when the vehicle factory (not shown), which installed the telematics unit 120 in the vehicle 110 during manufacture of the vehicle 110, transmits the vehicle identification number, the time of manufacture and the electronic serial number of the wireless phone 143 of telematics unit 120 to the call center 170. In that case, the first time in the vehicle log 260 is the time of manufacture and the first vehicle location in the vehicle log 260 is the factory location.

In yet another embodiment, the vehicle log 260 for vehicle 110 is set up the first time a message is received at the call center 110 in response to a matching electronic serial number found during stage S510. In that case, the first time in the vehicle log 260 is the registration request signal transmission time and the first vehicle location in the vehicle log 260 is the vehicle transmission location.

During stage S520 the registration request signal transmission time, the vehicle identification number and the vehicle transmission location, for the vehicle 110 correlated to the electronic serial number, are linked.

Alternately, the registration request signal transmission time and the vehicle transmission location linking will occur at the call center data base 230 or at the communication services manager 174 during the period of time between stages S516 and S518 of flowchart 500. Alternately registration request signal transmission time, the vehicle identification number and the vehicle transmission location linking will occur, in part, at the call center data base 230 and, in part, at the communication services manager 174 during the period of time between stages S516 and S518 of flowchart 500.

The linked registration request signal transmission time and the vehicle transmission location is located within the vehicle tracking database 250 by the end of stage S520.

During stage S522 the vehicle log 260 is located for the vehicle 110 having the vehicle identification number correlated with the electronic signal number of the received registration request signal data.

During stage S524 the linked data including the registration request signal transmission time and the vehicle transmission location is input into the vehicle log 260 for the vehicle 110 which emitted a registration request to a wireless tower 141 during stage S504. The data input into vehicle log 260 is used to track vehicles 110 during transport, for example, while shipping vehicle 110 from a factory to a car dealership. In an alternate example, the data input into vehicle log 260 is used to track vehicle 110 during transport from one car dealership to another car dealership. In one embodiment, updating to the vehicle log 260 for vehicle 110 is terminated upon sale of the vehicle 110.

After stage S524 the flowchart 500 proceeds to stage S508 and the call center 170 will continue to monitor the input at the wireless service provider database for electronic serial numbers of vehicles 110 in the vehicle database 240.

The vehicle tracking telematics systems 200 and 400 described here will allow tracking of vehicles 110 as they are transported from a factory to a vehicle dealership. The vehicle tracking telematics systems 200 and 400 automatically update a vehicle log 260 within a vehicle tracking database 250 to facilitate tracking at least the general location of a vehicle 110 under transport. The vehicle tracking telematics systems 200 and 400 can be used at the same time. This is desirable, for example, when the holding lots 210 are having receivers 220 installed and some holding lots 210 do not yet have the receivers 220.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of tracking vehicles, the method comprising:
   monitoring for registration request signal data;
   receiving the registration request signal data at a call center;
   determining a vehicle transmission location based on the registration request signal data;
   obtaining a registration request signal transmission time from the registration request signal data;
   determining a vehicle indentification number based on the registration request signal data; and
   updating a vehicle tracking database with the vehicle transmission location and the registration request signal transmission time.

2. The method of claim 1, further comprising:
   sending the registration request signal data from a vehicle in response to power up of a telematics unit.

3. The method of claim 1 wherein said monitoring for registration request signal data further comprises:
   monitoring inputs to a wireless service provider database; and
   sending the registration request signal data to the call center.

4. The method of claim 3 wherein said receiving registration request signal data at a call center further comprises:
   receiving an electronic serial number at the call center; and
   receiving at least one cell phone tower location at the call center.

5. The method of claim 4 wherein said determining a vehicle transmission location based on the registration request signal data further comprises:
   determining the vehicle transmission location based on the at least one cell phone tower location.

6. The method of claim 1 wherein said monitoring for registration request signal data further comprises:
   receiving the registration request signal data at a vehicle holding lot registration monitor; and
   sending the registration request signal data from the vehicle holding lot registration monitor to the call center.

7. The method of claim 6 wherein said receiving registration request signal data at a call center further comprises:
   receiving an electronic serial number at the call center; and
   receiving the vehicle holding lot registration monitor location at the call center.

8. The method of claim 7 said determining a vehicle transmission location based on the registration request signal data further comprises:
   determining the vehicle transmission location based on the vehicle holding lot registration monitor location.

9. The method of claim 1 wherein said determining a vehicle indentification number based on the registration request signal data further comprises:
   scanning a vehicle database within the call center database for an electronic serial number;
   locating the electronic serial number in the vehicle database; and
   retrieving the vehicle identification number linked with the electronic serial number within the vehicle data base.

10. The method of claim 1 wherein said updating a vehicle tracking database with the vehicle transmission location and the registration request signal transmission time further comprises:
    locating a vehicle log within the vehicle tracking database for a vehicle having the determined vehicle identification number;
    linking the vehicle transmission location and the registration request signal transmission time; and
    inputting the vehicle transmission location and time of transmission into the vehicle log.

11. A computer usable medium storing a computer program comprising:
  computer readable code for monitoring for registration request signal data;
  computer readable code for receiving the registration request signal data at a call center;
  computer readable code for determining a vehicle transmission location based on the registration request signal data;
  computer readable code for obtaining a registration request signal transmission time from the registration request signal data;
  computer readable code for determining a vehicle indentification number based on the registration request signal data; and
  computer readable code for updating a vehicle tracking database with the vehicle transmission location and the registration request signal transmission time.

12. The computer usable medium of claim 11, further comprising:
  computer readable code for sending the registration request signal data from a vehicle in response to power up of a telematics unit.

13. The computer usable medium of claim 11, further comprising:
  computer readable code for monitoring inputs to a wireless service provider database; and
  computer readable code for sending the registration request signal data to the call center.

14. The computer usable medium of claim 13 wherein said receiving registration request signal data at a call center further comprises:
  computer readable code for receiving an electronic serial number at the call center; and
  computer readable code for receiving at least one cell phone tower location at the call center.

15. The computer usable medium of claim 11, further comprising:
  computer readable code for receiving the registration request signal data at a vehicle holding lot registration monitor; and
  computer readable code for sending the registration request signal data from the vehicle holding lot registration monitor to the call center.

16. The computer usable medium of claim 11, further comprising:
  computer readable code for determining the vehicle transmission location based on at least one cell phone tower location.

17. The computer usable medium of claim 11, further comprising:
  computer readable code for scanning a vehicle database within the call center database for an electronic serial number;
  computer readable code for locating the electronic serial number in the vehicle database; and
  computer readable code for retrieving the vehicle identification number linked with the electronic serial number within the vehicle database.

18. The computer usable medium of claim 11, further comprising:
  computer readable code for locating a vehicle log within the vehicle tracking database for a vehicle having the determined vehicle identification number;
  computer readable code for linking the vehicle transmission location and the registration request signal transmission time; and
  computer readable code for inputting the vehicle transmission location and time of transmission into the vehicle log.

19. A vehicle tracking system comprising:
  means for monitoring for registration request signal data;
  means for receiving the registration request signal data at a call center;
  means for determining a vehicle transmission location based on the registration request signal data;
  means for obtaining a registration request signal transmission time from the registration request signal data;
  means for determining a vehicle indentification number based on the registration request signal data; and
  means for updating a vehicle tracking database with the vehicle transmission location and the registration request signal transmission time.

20. The system of claim 19, further comprising:
  means for sending the registration request signal data from a vehicle in response to power up of a telematics unit.

* * * * *